(12) United States Patent
Sauser

(10) Patent No.: US 8,875,900 B2
(45) Date of Patent: Nov. 4, 2014

(54) REPLACEABLE SCREEN PANEL SEAL STRIP

(75) Inventor: Edwin J. Sauser, Monticello, IA (US)

(73) Assignee: Terex USA, LLC, Westport, CT (US)

( * ) Notice: Subject to any disclaimer, the term of this patent is extended or adjusted under 35 U.S.C. 154(b) by 546 days.

(21) Appl. No.: 13/290,799

(22) Filed: Nov. 7, 2011

(65) Prior Publication Data

US 2012/0111775 A1    May 10, 2012

Related U.S. Application Data

(60) Provisional application No. 61/411,120, filed on Nov. 8, 2010, provisional application No. 61/522,016, filed on Aug. 10, 2011.

(51) Int. Cl.
*B07B 1/49* (2006.01)
*B07B 1/28* (2006.01)
*B07B 1/46* (2006.01)
*F16F 15/067* (2006.01)

(52) U.S. Cl.
CPC ... *B07B 1/46* (2013.01); *B07B 1/28* (2013.01); *F16F 15/067* (2013.01)
USPC ............ 209/409; 209/317; 277/628; 277/644

(58) Field of Classification Search
USPC ............................ 209/317, 409; 277/628, 644
See application file for complete search history.

(56) References Cited

U.S. PATENT DOCUMENTS

2012/0111774 A1* 5/2012 Sauser et al. .................. 209/317
2012/0111775 A1* 5/2012 Sauser ........................... 209/409

* cited by examiner

*Primary Examiner* — Terrell Matthews
(74) *Attorney, Agent, or Firm* — Simmons Perrine Moyer Bergman PLC

(57) ABSTRACT

A T shaped screen panel seal strip for use in spanning between screen support rails in a vibrating screen is disclosed, which has a plurality of notches therein in registration with the screen support rails so that the strip can be placed over either new or existing screen support rails (after having been cleaned of any cushioning cap material). The strip can be metallic or a plastic material. The method includes retrofitting existing screens with a new sealing strip by first removing any cushion cap material and then placing the T shaped seal strip over the support rails.

18 Claims, 2 Drawing Sheets

REPLACEABLE SCREEN PANEL SEAL STRIP

CROSS REFERENCE TO RELATED APPLICATIONS

This application claims the benefit of the filing date of the provisional patent application having Ser. No. 61/411,120, filed Nov. 8, 2010, and further claims the benefit of the filing date of a provisional application having Ser. No. 61/522,016, filed Aug. 10, 2011. This application relates to the co-pending patent application filed by Edwin J. Sauser and Jason Kreider, on even date herewith and being entitled: VIBRATING SCREEN SUSPENSION SYSTEMS, bearing attorney docket number 11800.015. The contents of these applications are incorporated herein in their entirety by these references.

BACKGROUND OF THE INVENTION

This invention relates to vibrating screens and more particularly to screen panels and even more particularly to seal strip systems for replaceable screen panels in vibrating screens.

The aggregate industry utilizes many styles of screen machines to sort aggregates by size. Most screen machines utilize vibration to agitate the mixture of aggregates to promote separation through various sized openings in the screening surfaces. Sorting is achieved by undersized particles passing through the openings in the screening surface and the oversize particles being retained above the screen surface. These machines usually have some type of vibrating mechanism to shake the unit and its screening surfaces.

Several layers, or decks, of screening surfaces can be installed in a machine which have screen media of various sized openings to allow sorting of granular material, which is fed into the machine, into several discreet particle sizes.

The screen surface media normally consists of a wire mesh, rigid or flexible panels, with punched or formed holes, all which have specific sized openings to allow passage of sized particles to the decks below, or out the bottom of the screen. The larger sized particles are retained above the surface and are usually discharged on the end opposite the feed end of the deck.

The screen media is normally made in sections to ease removal in order to change opening sizes and also to replace media when worn. The screen surface media is usually stretched in one direction, over a series of support rails. These rails are commonly positioned perpendicular to the stretched direction. These rails are usually positioned to produce a curved profile in order to keep the stretched media pulled into contact with the support rails as the machine vibrates. Without the curved "crowned" profile, and the tension on the media, the flexible media would flutter on the support rails as a result of the vibration, and cause fatigue failure of the media.

The support rails are usually steel bars with a resilient replaceable rubbery cap to provide cushion between the media and the steel support rails. Since the media is normally made in sections, the ends of the media sections, which are perpendicular to the support rails, are either overlapped, or a flat strip is provided below the panel ends to blank the area where the media panels butt together. This strip also provides a surface for the end of the media to rest on. This strip also blocks any oversized material from leaking between the panel ends. This is especially important when sorting smaller particles to prevent contamination of the small passed material with some over sized, retained material that could leak through, in the event a slight gap is present in the butt joint.

The media overlap method is less desirable since it is more difficult to install and also requires removal of the adjacent panels when replacing a worn panel. The support strip, or seal strip as it is commonly referred to, is more desirable since the ends of the media panels simply butt up to each other, making installation and removal of media easy.

These seal strips are usually welded flat bars which can wear out over time. Replacement is difficult since they must be cut from the deck rails and new ones welded in place. They are also difficult to reposition in the event a different length of media panel is desired and the seal strip is desired at different locations.

Consequently, there is a need for improvement in screen panel sealing systems for vibrating screens.

SUMMARY OF THE INVENTION

More specifically, an object of the invention is to provide a cost effective system for reducing unwanted movement of screen material within a vibrating screen.

It is a feature of the present invention to include a notched seal strip for spanning screen support beams in a vibrating screen.

It is an advantage of the present invention to reduce the time and expense associated with replacing screen panels in a vibrating screen.

It is another object of the present invention to increase the options available when replacing screen in a screen plant.

It is another feature of the present invention to provide a method to retrofit a T shaped notched seal strip on an existing vibrating screen.

It is another advantage of the present invention to provide a reduction in cost and down time associated with replacing screen in a vibrating screen.

The present invention includes the above-described features and achieves the aforementioned objects.

Accordingly, the present invention comprises a system and method of replacement screen panel seal strips for a vibrating screen which is a notched member spanning screen support rails.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
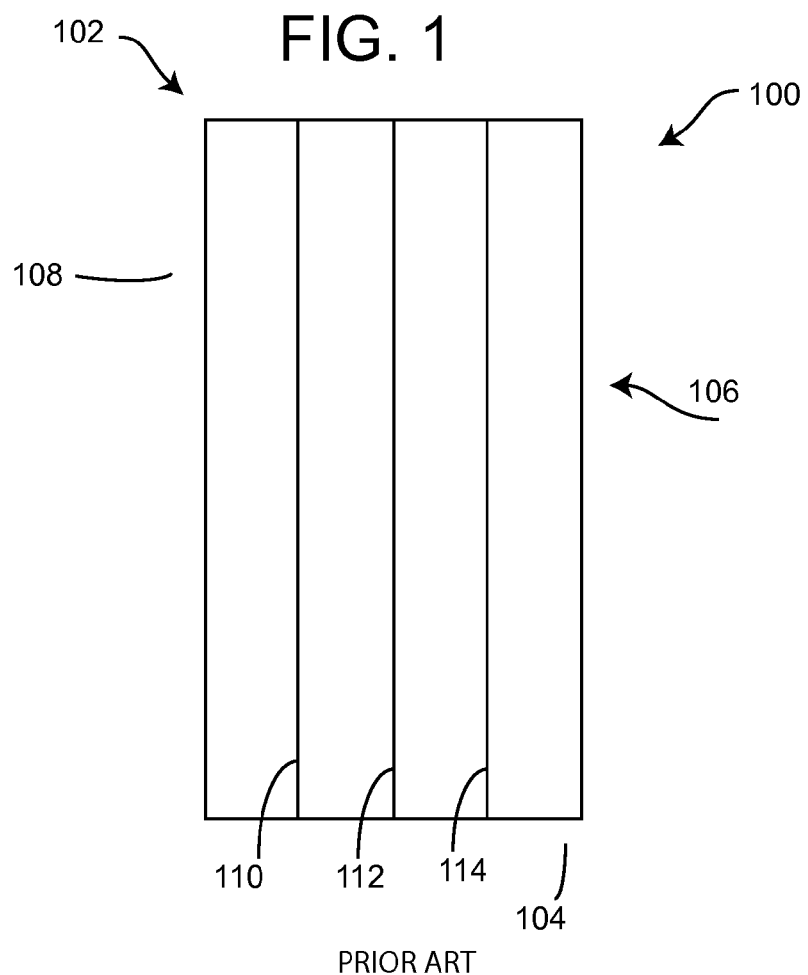
FIG. 1 is a simplified plan view of a screen deck and supporting rails of a screen plant of the prior art.

Referring now to the drawings, where like numerals refer to like matter throughout, and more particularly to FIG. 1 there is shown a simplified plan view of a screen deck, generally designated 100 of a prior art vibrating screen which shows screen supporting rails 110, 112 and 114. Deck 100 has a right side 106, a left side 108, a feed end 102 and a discharge end 104.

Figure 2:
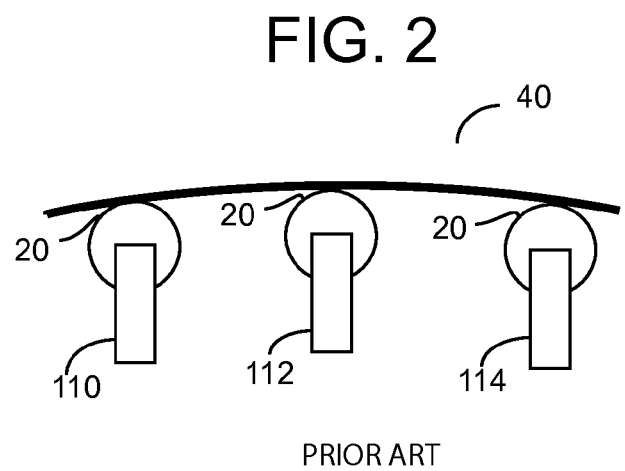
FIG. 2 is a simplified end view of a screen deck and supporting rails of a screen plant of the prior art.

Now referring to FIG. 2, The replaceable screen panel seal strip (SPSS) comprises a flexible or semi rigid strip of material that spans over the support rails 110, 112 and 114. The cross section of the SPSS must be wide enough on the top surface to provide sufficient wire cloth overlap to provide the seal. The cross section must be tall enough to provide enough rigidity to span between the deck rails without excessive deflection to allow leakage.

FIG. 2 shows a typical cross section across the width of a crowned wire cloth assembly.

The wire cloth 40 is stretched across the top of the support rails 110, 112, 114 which have cushioned covers 20.

Figure 3:
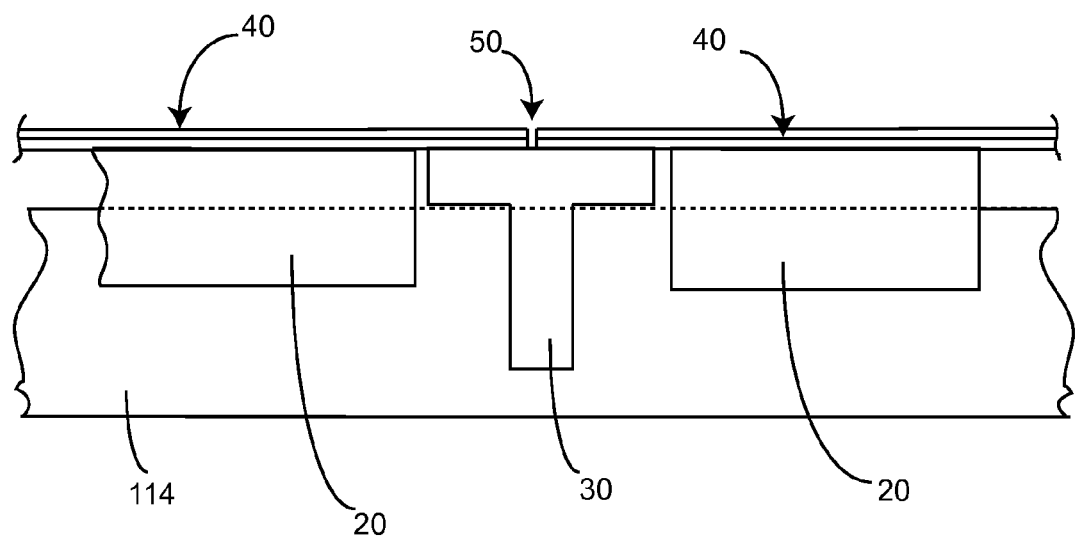
FIG. 3 shows a side view portion of a screen deck of a vibrating screen of the present invention, at the location where screen panels will butt together.

Now referring to FIG. 3 there is shown a view perpendicular to FIG. 2 where the wire panels 40 butt together at a gap 50. The seal strip 30, shown in this example as a "tee" section, is positioned to prevent material from passing through the gap 50 where the panels butt together. It should be understood that a "tee" shape strip is not the only shape that would function. A rectangular or even triangular shaped strip (with a flat top) could be used, so long as it spans the top of the supporting rails and extends between them.

The rail top covers 20 may need to be cut and butt up to the sides of the seal strip 30, keeping the seal strip 30 from migrating along the rails 110, 112, and 114 and keep it positioned to block the gap 50.

Figure 4:
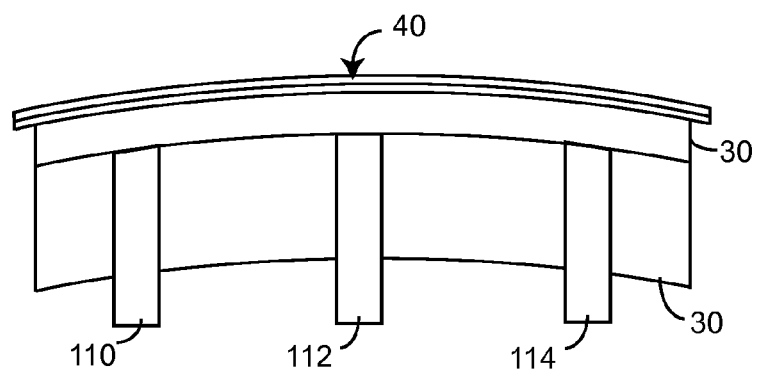
FIG. 4 shows an end view portion of a screen deck of a vibrating screen of the present invention.

Now referring to FIG. 4 there is shown the seal strip 30 which is partially notched between the support rails 110, 112, and 114. The top cap of the seal strip 30 is not cut and runs over the top of these support rails.

The wire cloth 40 is pulled down on the curved profile when the wire is pulled tight. The un-notched sections provide sufficient stiffness to prevent sag and leakage through the butt joint in areas between the rails.

The seal strip 30 can be notched to fit most support rail widths and spacings. The ends of the seal strip 30 must also be supported (not shown). These seal strip can be produced is a plurality of lengths or extruded into rolls, both of which are cut to fit the particular application. The seal strip can be made of rigid or soft elastomeric materials, for example rubber, polyurethane or polyethelyne compounds or from metallic materials.

It is believed that when these teachings are combined with the known prior art by a person skilled in the art, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. A screen panel seal strip comprising:
    a piece of material being sized and configured with a predetermined shape, where a horizontal top portion of the shape has a thickness characteristic which is substantially the same as a distance from a plurality of supporting rail to a top cushion cover disposed on said plurality of supporting rails for a predetermined vibrating screen;
    a plurality of voids disposed in an upright portion of said shape, where the voids have a dimension which is slightly larger but substantially the same as a rail width characteristic of said supporting rail; and
    said plurality of voids being spaced apart from each other in registration with said plurality of supporting rails, so that said piece of material can be caused to span a plurality of rails when said piece of material is pressed downward so that said voids are filled by a plurality of support rails.

2. The strip of claim 1 wherein said predetermined shape is a T shape.

3. The strip of claim 2 wherein said piece of material is resilient.

4. The strip of claim 3 wherein said piece of material is a polyurethane compound.

5. The strip of claim 3 wherein said piece of material is a rubber like material.

6. The strip of claim 3 wherein said piece of material is polyethelyne compound.

7. A method of providing a screen panel seal strip across a plurality of screen supporting rails of a vibrating screen, comprising the steps of:
    providing a piece of material being sized and configured in a predetermined shape, where a horizontal top portion of the predetermined shape has a thickness characteristic which is substantially the same as a distance from a plurality of supporting rail to a top cushion cover disposed on said plurality of supporting rails for a predetermined vibrating screen; a plurality of voids disposed in an upright portion of said predetermined shape, where the voids have a dimension which is slightly larger but substantially the same as a rail width characteristic of said supporting rail; and said plurality of voids being spaced apart from each other in registration with said plurality of supporting rails;
    determining that said plurality of screen supporting rails are free of any cushion cover matter in an area at least as wide as the length of the horizontal top section; and
    pressing said piece of material downward so that said plurality of voids are filled by said plurality of screen supporting rails.

8. The method of claim 7 wherein said predetermined shape is a T shape.

9. The method of claim 8 wherein said piece of material is resilient.

10. The method of claim 7 wherein said piece of material is a polyurethane compound.

11. The method of claim 7 wherein said piece of material is a rubber like material.

12. The method of claim 7 wherein said piece of material is a polyethelyne compound.

13. A system for providing a screen panel seal strip across a plurality of screen supporting rails of a vibrating screen, comprising the steps of:
    a piece of material being sized and configured in a predetermined shape, where a horizontal top portion of the predetermined shape has a thickness characteristic which is substantially the same as a distance from a plurality of supporting rail to a top cushion cover disposed on said plurality of supporting rails for a predetermined vibrating screen; a plurality of voids disposed in an upright portion of said predetermined shape, where the voids have a dimension which is slightly larger but substantially the same as a rail width characteristic of said supporting rail; and said plurality of voids being spaced apart from each other in registration with said plurality of supporting rails;
    a plurality of screen supporting rails which are free of any cushion cover matter in an area at least as wide as the length of the horizontal top section; and said plurality of voids are filled by said plurality of screen supporting rails.

14. The system of claim 13 wherein said predetermined shape is a T shape.

15. The system of claim 13 wherein said piece of material is resilient.

16. The system of claim 13 wherein said piece of material is a polyurethane compound.

17. The system of claim 13 wherein said piece of material is a rubber like material.

18. The system of claim 13 wherein said piece of material is a polyethelyne compound.

* * * * *